3,291,822
SALTS OF SULFOSULFINIC ACIDS AND A PROCESS FOR THEIR PREPARATION
Horst Baumann, Dusseldorf, Germany, and Johann Heinrich Helberger, deceased, late of Munich-Thalkirchen, Germany, by Henning Von Dobeneck, executor, Munich, Germany, assignors to Bohme Fettchemie, G.m.b.H., Dusseldorf, Germany, a corporation of Germany
No Drawing. Filed Dec. 23, 1964, Ser. No. 421,155
Claims priority, application Germany, Feb. 26, 1959, H 35,742
13 Claims. (Cl. 260—513)

This application is a continuation-in-part application of copending, commonly assigned United States patent application No. 10,066, filed February 23, 1960, now abandoned.

This invention relates to a process for producing organic sulfo-sulfinate compounds, that is salts of organic dibasic acids having both a sulfonic and a sulfinic acid radical. The invention further relates to the production of disulfonates.

It is known that water-soluble acid sulfites, such as sodium acid sulfite, undergo a usually very smooth addition reaction with organic compounds having an activated double bond to form salts of organic monosulfonic acids. Such organic compounds with an activated double bond are, for example, those in which the double bond is in α-β position with respect to a carbonyl group, as is the case in acrolein or in maleic acid esters. It is further known that unsaturated organic compounds with a non-activated double bond also undergo an addition reaction with acid sulfites, whereby the salts of organic monosulfonic acids are also obtained; however, as M. S. Kharasch et al. first found (see Jour. of Org. Chemistry 3, 175 [1939]), the addition reaction takes place only if oxygen or another oxidizing agent is present during the reaction between the olefinic compound and the acid sulfite. In other words, the addition reaction takes place only under oxidizing conditions.

We have surprisingly found that it is also possible to bring about an addition reaction of two mols to an acid sulfite per non-activated double bond if one mol of an olefin is reacted with at least two mols of an acid sulfite under oxidizing conditions, at a pH-value of the solution, which is below 5, preferably between 4 and 5. Examples of suitable olefins are ethylene, propylene and higher homologs, as well as unsaturated alcohols, such as allyl alcohol, crotyl alcohol and their ethers such as glycol ethers. Suitable acid sulfites are primarily the acid sulfites of alkali metals and ammonia; however, acid sulfites of organic bases may be used, which have the advantage of being readily soluble in organic solvents, such as alcohol, and therefore make it possible to work not only in aqueous but also in organic solution. However, when using organic solvents, care should be taken that the pH-value is kept lower than 5 through the addition of acid, as the work in organic solvents reduces the disossociation of the bisulfites. The simplest suitable oxidizing agent is oxygen, especially in the form of atmospheric air.

Quite generally, the process consists of bringing the mixture of the unsaturated compound and a concentrated solution of the acid sulfite in intimate contact with oxygen, preferably in the form of atmospheric air, by shaking or stirring, whereby the solution during the entire reaction is maintained at a pH-value less than 5. Since the reaction is exothermic, its initiation may be recognized by the immediate rise in temperature. As to the temperature to be used, the rule is that the reaction proceeds smoothly at relativetly low temperatures; however, it may be carried out within a wide temperature range which extends from about −10° C. to about 100° C; most advantageously, it is carried out within a range of about 10 to 50° C. Because of the exothermic character of the reaction it is not necessary to have an external heat supply, but it may be advantageous to draw off some of the heat of reaction by cooling. The period of time within which the reaction goes to completion depends primarily upon how intensively the reaction components are intermixed with each other; if the olefin is readily soluble in the liquid phase the reaction takes from one to several hours. The reaction can be carried out to complete reaction of the olefin, provided that, in addition to the two mols of acid sulfite per olefinic double bond which are required for the addition reaction, an extra amount of acid sulfite is provided which changes into the sulfate by virtue of the oxidation reaction which occurs simultaneously with the addition reaction; in the event that air is used as the oxidizing agent, this excess is about 10%, and if pure oxygen is used the excess is even higher, as has been found by experience. It is also possible to work in the presence of catalysts.

After the reaction is terminated and after the sulfate which is always formed is separated, the organic salts can be isolated, mostly in amorphous form, from the solution by concentration or possibly by addition of a suitable organic solvent, such as alcohol. In some cases it is possible to cause the amorphous, syrupy precipitates thus obtained to crystallize.

Based on analysis, the new compounds are salts of dibasic, sulfur-containing acids which are substantiatlly different from disulfonic acids. They differ from disulfonic acids in that they have a strong reducing effect; for example, they discolor a permanganate solution instantaneously in the cold and can be transformed into the salts of the corresponding disulfonic acids either with oxidizing agents, particularly smoothly with hydrogen peroxide in neutral solution, or also by autoxidation. Based on this behavior, it must be assumed that, according to the general schematic reaction equation

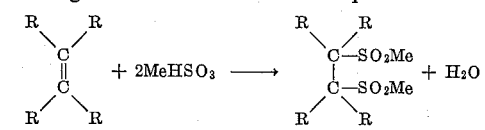

wherein R is selected from the group consisting of hydrogen, lower alkyl, lower alkanol and lower glycol ether and Me is a monovalent ion, the salts of organic dibasic acids are formed in which two neighboring carbon atoms are substituted by a sulfonic acid group and a sulfinic acid group, respectively. Compounds of this type have heretofore not been described in the literature. In addition to these new salts, which are designated as sulfo-sulfinates, the formation of the corresponding disulfonates is observed, but in most instances only in small amounts; the formation of these disulfonates may be due to a possible autoxidation of the primarily formed sulfo-sulfinates under the reaction conditions. On the other hand, it is possible to increase the amount of disulfonates by providing harsher autoxidation conditions, for example by using catalysts such as a copper salt; similarly, by subsequent treatment of the sulfo-sulfonates with suitable oxidizing agents, such as hydrogen peroxide, they can be virtually quantitatively transformed into the corresponding disulfonates.

It is, therefore, an object of this invention to provide a process for producing salts of organic dibasic acids having a sulfinic and a sulfonic acid radical.

Another object is to provide a process for producing salts of organic disulfonic acids.

These and other objects of our invention will become apparent as the description thereof proceeds.

In order to obtain as high a yield of the new sulfo-sulfinates as possible, it is necessary that the acid sulfite does not contain any neutral sulfite; in other words, the solution which is used for the reaction should contain at least a stoichiometrical ratio of dioxide to base such as it is present in an acid sulfite. A small excess of sulfur dioxide above this ratio is not detrimental; such an excess is present anyway if that amount of acid sulfite is added in excess above the amount required for the addition to a double bond and it is oxidized into sulfate during the reaction. As already mentioned, experience has shown that this excess is about 10% if atmospheric air is used as the oxidizing agent. If the solution of the acid sulfite still contains neutral sulfite, the reaction forms not only the new sulfo-sulfinates but also the known mono-sulfonates in more or less large quantities; however, if the reaction is carried out in a solution which is free from neutral sulfites, the formation of the mono-sulfonates is almost completely suppressed. For the formation of a new sulfo-sulfinate in the reaction solution during the entire reaction time the pH-value must be less than 5 preferably between 4 and 5. This is actually the case in aqueous bisulfite solutions, which do not contain sulfite, that is, the pH-value practically does not change during the reaction time. In organic solvents or organic-aqueous solvent mixtures an acid addition for maintaining the desired pH range is necessary on account of the reduced disassociation of the bisulfite.

It has further been found that not only organic compounds with a non-activated double bond but also acetylene and its derivatives can be subjected in analogous fashion, that is under oxidizing conditons at a pH of 4 to 5, to an addition reaction with 2 mols of acid sulfite, whereby unsaturated sulfo-sulfinates are formed with good yields in accordance with the general schematic reaction equation:

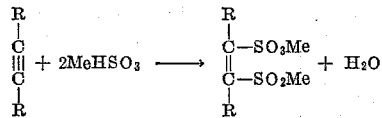

wherein Me is a monovalent ion. Although it is known that 2 mols of an acid sulfite can be made to undergo an addition reaction with an acetylenic triple bond, the products of this reaction are salts of saturated organic disulfonic acids. This reaction proceeds primarily at elevated temperatures, that is at temperatures around 100° C., and, as our own experiments have shown, also under complete exclusion of oxygen, under ionic conditions. In contrast thereto, the reaction leading to the formation of the new unsaturated sulfosulfinates proceeds smoothly at substantially lower temperatures, but only in the presence of a suitable oxidizing agent such as oxygen primarily in the form of atmospheric air, under radical forming conditions. Similar to the saturated sulfo-sulfinates, the unsaturated sulfo-sulfinates may also be oxidized to the corresponding unsaturated disulfonates, and particularly smoothly with the aid of hydrogen peroxide. The new unsaturated disulfonates differ from the known saturated disulfonates in a characteristic manner; for example, that they discolor an aqueous permanganate solution immediately in the cold, whereas the saturated disulfonates are as good as completely stable in the cold against permanganate.

The alkali metal salts of the new saturated and unsaturated sulfo-sulfinic acids are extremely readily soluble in water, but practically insoluble in organic solvents. They can be precipitated from a moderately to highly concentrated aqueous solution with alcohol, mostly in syrupy form. An isolation of the sulfo-sulfinates, however, is in most cases not necessary, and instead they may be employed for further reactions, for example, for oxidation into the corresponding disulfonates, in the form of the original solution; the disulfonates are in most cases marked by excellent crystallization properties and, as a rule, are more difficultly soluble in water than the sulfo-sulfinates from which they are formed.

The sulfo-sulfinates and disulfonates, which are readily accessible through the new process, have a manifold practical utility, particularly as intermediate products for further reactions.

The new lower molecular organic dibasic acids having a sulfinic and a sulfonic acid radical or their salts have valuable reducing properties and may be used as reducing agents in vat dyeing processes. Furthermore these acids are qualified as catalysts for the emulsion or block polymerization of methacrylic acid or styrene. They are added in amounts of 1–2%, calculated on the monomeric substance. The polymerization is performed in usual manner at temperatures of 20 to 30° C.

The higher molecular sulfo-sulfinic acids or disulfonic acids having aliphatic or aliphatic-aromatic radicals of at least 8 carbon atoms or their salts, respectively, have soaplike character. They are usable as washing and cleaning agents in aqueous solutions and are applied in amounts of 0.2 to 2.5 g./l. aqueous treating bath.

The following specific examples are set forth to further illustrate our invention and to enable persons skilled in the art to better understand and practice the invention, and are not intended to be limitative.

*Example I*

125 parts by weight of potassium pyrosulfite, corresponding to 1 mol potassium bisulfite plus about 10% excess, were dissolved in 500 parts by weight of water by gentle heating; after cooling the solution thus obtained to 20 to 30° C., 35 parts by volume of allylalcohol, corresponding to ½ mol, were added all at once and the solution obtained thereby, which had a pH-value of 4 to 5, was mechanically agitated so vigorously that bubbles of air were constantly distributed therethrough. If desired, a gentle stream of air may be passed through the agitated solution. The temperature rose immediately and, depending upon the intensity of the agitation, reached 35 to 40° C. and thereafter dropped again slowly. An excessively sharp increase in the temperature can be avoided by reducing the vigorousness of the agitation and the rate of introduction of air, or also by cooling. The pH-value of the solution stays generally at 4 to 5; at the end of the conversion on account of the autoxidation of the $HSO^-_3$ it descends somewhat into the stronger acidic range. When the allylalcohol was completely consumed, which occurred after about 2 hours, the reaction mixture was stirred for one more hour and the colorless solution thus obtained was then worked up. The 1-hydroxypropane-2-sulfinic acid-3-sulfonic acid potassium salt having the probable formula:

was contained in the solution and fas formed with a yield of about 90% of theory. This salt could, for example, be isolated in a solid crystalline form by the following method:

The solution was first acidified was 30% sulfuric acid, so that the entire amount of sulfurous acid still present in the solution was liberated. The sulfurous acid was driven off by distillation under reduced pressure; since only a small amount of this acid was present, this occurred after a short period of time. The remaining solution was still distinctly acid and was now neutralized exactly (pH=7) with 2 N potassium hydroxide and was then again concentrated under reduced pressure until the major portion of the potassium sulfate formed during the preceding operation separated out; the evaporation was interrupted and the crystallization of the potassium sulfate was completed by addition of 50 to 100 parts by volume of alcohol. A separation of the system into two phases must not occur, and if it occurs it must be reversed by careful addition of water. After allowing the mixture to stand, the potassium sulfate, which had then practically quantitatively crystallized, was separated by vigorous vacuum filtration and the filter cake was washed with about 50% alcohol. 15 to 20 parts by weight of dry potassium sulfate were obtained, the combined filtrates were then strongly concentrated under reduced pressure until the solution amounted to only about 120 to 150 parts by volume. At this point 200 to 300 parts by volume of alcohol were added to the concentrated, syrupy salt solution, whereupon it immediately divided into two phases. The two phases were then intermixed as intimately as possible by vigorous stirring. After some time, but rapidly upon innoculating the solution, the aqueous phase began to solidify and the potassium sulfo-sulfinate crystallized out. By vigorous agitation of the entire mass the aqueous phase finally completely disappeared and the salt was obtained in a flocculent readily filterable form. It was separated by vigorous vacuum filtration, washed once or twice with dilute alcohol and dried at 70 to 80° C. The yield of dry, already very pure raw salt amounted to 125 to 130 parts by weight, corresponding to 90 to 94% of theory.

The potassium salt of 1-hydroxy-propane-2-sulfinic acid 3-sulfonic acid thus obtained was a pure white, solid mass which was extremely soluble in water. The salt could be recrystallized from a concentrated (about 60 to 70%) aqueous solution by addition of alcohol until phase separation, whereby it was obtained in the form of fine, dentritically arranged, strongly intertwined aggregates. The dry salt was practically barely hygroscopic. Its dilute aqueous solution decolorized a permanganate solution instantly. It also reacted with other oxidation agents, for example, silver nitrate or mercuric chloride as well as with hypochlorite and hydrogen peroxide.

During the reaction of the allylalcohol with 2 mols of potassium acid sulfite under the above described conditions a small percentage of the potassium salt of 1-hydroxy-propane-2,3-disulfonic acid was formed as a side product and was separated from the raw sulfo-sulfinate, for example, as follows: for this purpose the moderately concentrated, about 50% aqueous solution of raw potassium sulfo-sulfinate was admixed with alcohol until phase separation occurred and was then allowed to stand in the cold, preferably at 0° C., for several days or up to several weeks. The potassium salt of 1-hydroxypropane-2,3-disulfonic acid gradually separated out in the form of a crystalline crust on the walls of the container and was isolated in customary fashion. About 3 to 6% of theory were obtained. This amount was increased by adding a small amount of copper sulfate to the addition reaction mixture as a catalyst; with the above indicated quantitative ratios, about 0.05 to 0.1 part by weight of copper sulfate were sufficient. The yield of potassium disulfonate then amounted to about 25 to 35% of theory.

*Example II*

An aqueous solution of the potassium salt of 1-hydroxy-propane-2-sulfinic acid-3-sulfonic acid is prepared as described in Example I, by reaction of 125 parts by weight of potassium pyrosulfite with 35 parts by volume of allylalcohol in 500 parts by volume of water, at a pH of 4 to 5. The solution, which must no longer contain any free allylalcohol, was then exactly neutralized with 2 N potassium hydroxide. Thereafter, the neutral solution was allowed to flow slowly into 30% hydrogen peroxide, accompanied by mechanical stirring, so that the rapidly increasing temperature was maintained between 45 and 48° C.; if necessary, care should be taken by exterior cooling that this temperature is not substantially exceeded. The end point of the oxidation may be recognized when the temperature begins to drop; this was the case when about 50 to 55 parts by volume of the 30% hydrogen peroxide were consumed; a small excess of hydrogen peroxide is not detrimental and may readily be decomposed and thus removed by continuing to stir for about one hour and catalytically decomposing it, for example, with platinicized asbestos or manganese dioxide. During the addition of the peroxide the pH-value of the reaction solution was always maintained neutral by addition of small amount of 2 N potassium hydroxide.

The possibly filtered solution was then concentrated under reduced pressure until the major portion of the potassium sulfate contained therein crystallized out; the precipitation was completed by addition of about 50 parts by volume alcohol while gently warming, and the precipitate was separated by vacuum filtration while it was still warm. Then filter cake was washed with a small amount of 50% alcohol and the filtrates thus obtained were further concentrated under reduced pressure until crystallization of the 1-hydroxy-propane-2,3-disulfonate occurred. By addition of 50 to 80 parts by volume alcohol in small portions, accompanied by constant stirring, the crystallization of the potassium salt was brought to completion. After standing for several hours in the cold, the precipitate was separated by vacuum filtration and the filter cake was first washed with 50% alcohol, then with undiluted alcohol, and finally dried. The yield was 110 parts by weight, and by working up the mother liquor and wash liquid an additional parts by weight of very pure disulfonate were readily obtained; the total yield thus amounted to 120 parts by weight and even more, which corresponds to about 80% of theory based on the amount of allylalcohol originally used.

The salt very probably has the following structural formula:

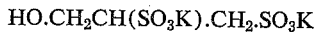

$$HO.CH_2CH(SO_3K).CH_2.SO_3K$$

The salt was very readily soluble in water, accompanied by strong cooling of the solution, although it was distinctly more difficultly soluble than the crystalline potassium salt of 1-hydroxy-propane-2-sulfinic acid 3-sulfonic acid desscribed in Example I. The salt partially crystallized from a 50 to 60% aqueous solution, prepared by heating, in the form of coarse prisms, and by addition of alcohol, wherein the salt was practically insoluble, the crystallization could be brought practically to completion. The dry salt was not hygroscopic. Its aqueous solution was stable against permanganate in the cold.

When the potassium pyrosulfite was replaced by an equimolecular amount of sodium pyrosulfite and the potassium hydroxide was replaced by sodium hydroxide, while otherwise following the above indicated procedure, the sodium salt of 1-hydroxy-propane-2,3-disulfonic acid was obtained with the same yield as the potassium salt. The sodium salt was also very readily soluble in water. It crystallized out of a saturated aqueous solution, prepared by heating, and, similar to the potassium salt, the crystallization could be brought to completion by addition of alcohol to the aqueous solution.

*Example III*

As indicated in Example I, an aqueous solution of 125 parts by weight of potassium pyrosulfite in 500 parts by volume of water was reacted with 51 parts by weight of the monoglycol ether of allylalcohol, accompanied by stirring, while passing air through the reaction mixture, at a ph of 4 to 5. After an initial temperature of 26° C., a temperature increase from 15° C. to 41° C. was observed within 30 minutes; care was taken that this temperature was not exceeded by providing external cooling. After 3 to 4 hours the reaction had gone to completion. Upon working up the reaction solution as described in Example I, the dipotassium salt of the monoglycol ether of 1-hydroxy-propane-2-sulfinic acid-3-sulfonic acid was obtained with a yield in excess of 90% of theory. In anhydrous condition, this compound was an extremely water-soluble, colorless, vitrious mass. It possibly has the following structural formula:

$$HOCH_2CH_2OCH_2CH(SO_2K).CH_2SO_3K$$

The aqueous solution of this salt discolored a permanganate solution instantaneously in the cold. The sulfo-sulfinate could, as described in Example II, be very smoothly transformed with 30% hydrogen peroxide into the dipotassium salt of the disulfonic acid having the probable formula $$HOCH_2CH_2OCH_2CH(SO_3K).CH_2SO_3K$$

Approximately 50 to 55 parts by volume of 30% hydrogen peroxide were required for ths transformation, based upon the above indicated quantitative ratios. The potassium salt of the monoglycol ether of 1-hydroxy-propane-2,3-disulfonic acid was obtained with a yield of more than 80% of theory, based upon the amount of allylalcohol monoglycol ether originally used, and, in anhydrous condition, represented an extremely water-soluble, vitreous mass. The aqueous solution of the salt was stable against permanganate in the cold.

Example IV

As indicated in Example I, an aqueous solution of 125 parts by weight of potassium pyrosulfite in 500 parts by volume of water was reacted with 44 parts by weight of butene-(2)-diol-(1,4), accompanied by stirring, and possibly while additionally passing air through the reaction mixture, at a pH of 4 to 5. The temperature rose gradually during the reaction; for example, when it is begun at about 25° C., it rose to 30° C. within one hour. After a reaction period of about 5 hours the butene-diol had completely reacted and had been transformed into the sulfo-sulfinate of the probable formula, $$HOCH_2CH(SO_2K).CH(SO_3K).CH_2OH$$

with a yield of about 70% of theory. It could either be isolated as described in Example I, or directly transformed by oxidation with 30% hydrogen peroxide into the potassium salt of 1,4-dihydroxy-butane-2,3-disulfonic acid, as described in Example II. This dipotassium salt which has the probable formula $$HOCH_2CH(SO_3K).CH(SO_3K).CH_2OH$$

was obtained with a yield of 95 to 100 parts by weight of pure compound, corresponding to a yield of more than 60% of theory, in the form of a compound which crystallized well from a concentrated aqueous solution. The salt is very readily soluble in water, but practically insoluble in alcohol. The aqueous solution does not discolor permanganate in the cold.

Example V 60 parts by weight of potassium pyrosulfite were dissolved in 250 parts by volume of water and then 25 parts by volume of alcohol were added. While vigorously stirring the resulting solution, ethylene and at the same time air in a ratio of about 10:1 were passed into the solution which remained constantly at pH 4 to 5 through the addition of a few drops of diluted $H_2SO_4$, at 20 to 30° C. at a rate such that the ethylene reacts practically completely. After substantially all of the acid sulfite had reacted the solution thus obtained was worked up as described in Example I. The potassium salt of ethane -1-sulfinic acid-2-sulfonic acid formed thereby was obtained with a good yield and could, as described in Example II, be transformed by oxidation with 30% hydrogen peroxide in neutral aqueous solution into the potassium salt of the known ethane-1,2-disulfonic acid with practically quantitative yields. This disulfonic acid could, in turn, be transformed with phosphorus pentachloride into the known ethane-1,2-disulfochloride having a melting point of 92° C.

Example VI

When the ethylene in Example V was replaced by propylene, while otherwise using the potassium pyrosulfite, water and alcohol in the same quantitative ratios as indicated in the preceding example and working at pH 4 to 5, the dipotassium salt of propane-sulfonic acid-sulfinic acid was obtained with very good yields. By oxidation in neutral aqueous solution with 30% hydrogen peroxide, according to the method described in Example II, the dipotassium salt of the known propane-1,2-disulfonic acid was obtained therefrom with excellent yields. The 1,2-disulfo-chloride obtained from the disulfonic acid by reaction with phosphorus pentachloride in known fashion had a melting point of 47 to 49° C. (literature 48° C).

Other olefins which are gases at ordinary temperatures could also be transformed into sulfo-sulfinates as well as into disulfonates in entirely analogous fashion.

Example VII 15 parts by weight of propargyl alcohol were introduced all at once into a solution of 60 parts by weight potassium pyrosulfite in 250 parts by volume of water, which is held constantly at pH 4 to 5 through addition of diluted $H_2SO_4$ and the resulting mixture was stirred while continuously introducing air for 3 to 4 hours. The temperature rose from about 25° C. at the beginning of stirring to about 35° C. and then again dropped slowly. After complete consumption of the propargyl alcohol the reaction mixture was worked up as described in Example I. The dipotassium salt of 1-hydroxy-propene-2-sulfinic acid-3-sulfonic acid was obtained with a yield of about 60% of theory in the form of an amorphous, very readily water-soluble product.

The unsaturated sulfo-sulfinate could also be transformed with very good yields into the dipotassium salt of 1-hydroxy-propene-2,3-disulfonic acid by oxidation with hydrogen peroxide in neutral solution, as described in Example II, without previous isolation into sulfo-sulfinate. The disulfonate crystallized out of a concentrated aqueous solution in the form of coarse needles after a small amount of alcohol was added to the solution. These needles were readily soluble in water and, in contrast to the saturated dipotassium salt of Example II, they instantaneously discolored a potassium permanganate solution in the cold. In analogous fashion, by replacing the propargyl alcohol with an equimolecular amount of 1,4-butyne-diol in the above example, the dipotassium salt of 1,4-dihydroxy-butene-2-sulfinic acid-3-sulfonic acid could be obtained, and by oxidation of the latter with hydrogen peroxide in neutral aqueous solution according to the method of Example II, the sulfo-sulfinate could be transformed into the dipotassium salt of 1,4-dihydroxy-butene-2,3-disulfonic acid, which was a well crystallized product.

Example VIII

By passing 15.0 parts by weight of sulfur dioxide into a mixture consisting of 25.3 parts by weight of triethylamine, 100 parts by volume of ethanol and 10 parts by volume of water, an aqueous-alcoholic solution of triethylamine hydrogen sulfite was obtained which had a pH-value of 4 to 5. While vigorously stirring this solution, a gas mixture of 70% acetylene and 30% air was introduced at a rate such that the acetylene was absorbed as completely as possible. The temperature was maintained at about 20° C. The pH-value of the mixture was maintained at the original value of 4 to 5 by frequent addition of a small amount of triethylamine. A sufficient quantity of the acetylene-air mixture was introduced until the acid sulfite had virtually completely disappeared.

After completion of the reaction, the mixture was acidified with dilute sulfuric acid and the alcohol and a small amount of sulfur dioxide were driven off by distillation under reduced pressure. Thereafter, the solution was made alkaline by adding 5 N potassium hydroxide, so that the triethylamine was completely liberated; the base was then driven off by renewed distillation under reduced pressure and the solution was then concentrated until the major portion of the potassium sulfate formed by the reaction had separated out. The suspension thus obtained was exactly neutralized with dilute sulfuric acid and the precipitation of the potassium sulfate was brought to completion by the addition of alcohol. After separating the potassium sulfate by vacuum filtration, a water-clear filtrate was obtained which contained the potassium salt of ethene-1-sulfonic acid-2-sulfinic acid; by dehydration under reduced pressure the salt could be obtained in the form of an uncrystallized syrup.

For the purpose of transforming the sulfo-sulfinate into the potassium salt of ethene-1,2-disulfonic acid, the syrup obtained above was dissolved in water to form an about 10% solution, which was then oxidized with hydrogen peroxide by the procedure described in Example II. By strong concentration of the oxidized solution under reduced pressure, the unsaturated disulfonate was obtained with good yields in crystalline form. The salt could be recrystallized from water and was then obtained in the form of coarse parallelepipeds.

While we have described certain specific examples and preferred modes of practice of our invention, it will be understood that the invention is not limited thereto, and that various changes and modifications may be made without departing from the spirit of the disclosure and the scope of the appended claims.

We claim:

1. A process for the production of salts of organic sulfo-sulfinic acids which comprises the steps of reacting from about two to three mols of a water-soluble acid sulfite compound, selected from the group consisting of alkali metal acid sulfites, ammonium acid sulfites and acid sulfites of organic bases, while maintaining the reaction at a pH from about 4 to less than 5 with about one mol of an unsaturated aliphatic compound having a structural formula selected from the group consisting of

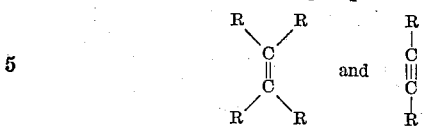

wherein R is a member selected from the group consisting of hydrogen, lower alkyl, lower alkanol and lower glycol ether radicals in the presence of an oxidizing agent selected from the group consisting of oxygen and atmospheric air, under atmospheric pressure, at a temperature of from about −10 to 100° C.

2. A process for the production of salts of organic sulfo-sulfinic acids which comprises the steps of reacting from about two to three mols of a water-soluble acid sulfite compound, selected from the group consisting of alkali metal acid sulfites, ammonium acid sulfites and acid sulfites of organic bases, while maintaining the reaction at a pH from about 4 to less than 5 with about one mol of an unsaturated aliphatic compound having a structural formula selected from the group consisting of

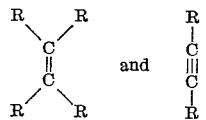

wherein R is a member selected from the group consisting of hydrogen, lower alkyl, lower alkanol and lower gycol ether radicals in the presence of using an oxidizing agent selected from the group consisting of oxygen and atmospheric air, at atmospheric pressure, and in the presence of copper (II) sulfate as a catalyst at a temperature of from about −10 to 100° C.

3. A process for the production of salts of organic sulfo-sulfinic acids comprising the steps of reacting from about two to three mols of a water-soluble acid sulfite compound, selected from the group consisting of alkali metal acid sulfites, ammonium acid sulfites and acid sulfites of organic bases, while maintaining the reaction at a pH from about 4 to less than 5 with about one mol of an unsaturated aliphatic compound having a structural formula selected from the group consisting of

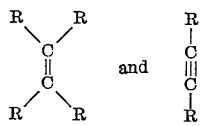

wherein R is a member selected from the group consisting of hydrogen, lower alkyl, lower alkanol and lower glycol ether radicals in the presence of atmospheric air as an oxidizing agent, at a temperature of from about −10 to 50° C.

4. A process for the production of the dipotassium salt of 1-hydroxypropane - 2 - sulfinic - 3 - sulfonic acid which comprises reacting from about two to three mols of potassium bisulfite while maintaining the reaction at a pH from about 4 to less than 5 with about one mol of allyl-alcohol in the presence of an oxidizing agent selected from the group consisting of oxygen and atmospheric air, at a temperature of from about −10 to 100° C.

5. A process for the production of the disodium salt of 1 - hydroxypropane - 2 - sulfinic-3-sulfonic acid which comprises reacting from about two to three mols of sodium bisulfite while maintaining the reaction at a pH from about 4 to less than 5 with about one mol of allyl-alcohol in the presence of an oxidizing agent selected from the group consisting of oxygen and atmospheric air, at a temperature of from about −10 to 100° C.

6. A process for the production of the dipotassium salt of monoglycolether of 1-hydroxypropane-2-sulfinic-3-sulfonic acid which comprises reacting from about two to three mols of potassium bisulfite while maintaining the reaction at a pH from about 4 to less than 5 with about one mol of the monoglycolether of allylalcohol in the presence of an oxidizing agent selected from the group consisting of oxygen and atmospheric air, at a temperature of from about −10 to 100° C.

7. A process for the production of the dipotassium salt of 1,4 - dihydroxy-butane-2-sulfinic-3-sulfonic acid which comprises reacting from about two to three mols of potassium bisulfite wile maintaining the reaction at a pH from about 4 to less than 5 with about one mol of butene-(2)-diol-(1,4) in the presence of an oxidizing agent selected from the group consisting of oxygen and atmospheric air, at a temperature of from about −10 to 100° C.

8. A process for the production of the dipotassium salt of ethane-1-sulfinic-2-sulfonic acid which comprises reacting from about two to three mols of potassium bisulfite while maintaining the reaction at a pH from about 4 to less than 5 with about one mol of ethylene in the presence of an oxidizing agent selected from the group consisting of oxygen and atmospheric air, at a temperature of from about −10 to 100° C.

9. A process for the production of the dipotassium salt of propane-1-sulfonic acid-2-sulfinic acid which comprises reacting from about two to three mols of potassium bisulfite while maintaining the reaction at a pH from about 4 to less than 5 with about one mol of propylene in the presence of an oxidizing agent selected from the group consisting of oxygen and atmospheric air, at a temperature of from about −10 to 100° C.

10. A process for the production of the dipotassium salt of 1-hydroxy-propene-2-sulfinic acid-3-sulfonic acid which comprises reacting from about two to three mols of potassium bisulfite while maintaining the reaction at a pH from about 4 to less than 5 with about one mol of propargyl alcohol in the presence of an oxidizing agent selected from the group consisting of oxygen and atmospheric air, at a temperature of from about −10 to 100° C.

11. A process for the production of the dipotassium salt of 1,5-dihydroxy-butene-2-sulfinic acid-3-sulfonic acid which comprises reacting from about two to three mols of potassium bisulfite while maintaining the reaction at a pH from about 4 to less than 5 with about one mol of 1.4-butynediol in the presence of an oxidizing agent selected from the group consisting of oxygen and atmospheric air, at a temperature of from about —10 to 100° C.

12. A process for the production of the dipotassium salt of ethene-1-sulfinic acid-2-sulfonic acid which comprises reacting from about two to three mols of triethylammonium hydrogen sulfite while maintaining the reaction at a pH from about 4 to less than 5 with about one mol of acetylene in the presence of an oxidizing agent selected from the group consisting of oxygen and atmospheric air, at a temperature of from about —10 to 100° C., and subsequently treating with potassium hydroxide.

13. A compound having a general structural formula selected from the group consisting of

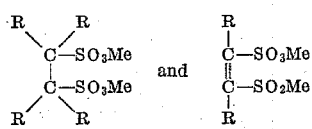

wherein R is a member selected from the group consisting of hydrogen, lower alkyl, lower alkanol and lower glycol ether radicals, and Me represents a monovalent ion, selected from the group consisting of a sodium ion, a potassium ion, an ammonium ion, and alkyl substituted primary, secondary and tertiary ammonium ions.

References Cited by the Examiner

UNITED STATES PATENTS 2,318,036  5/1943  Werntz _____ 260—513
3,002,903  10/1961  Foulke et al. _____ 260—513

OTHER REFERENCES

Kharasch et al.: "Journal of Organic Chemistry," vol. 3 (1938) pp. 175–192.

Gilman, "Organic Chemistry," vol. 1, and ED., p. 917 (1953).

RICHARD K. JACKSON, *Primary Examiner.*

LORRAINE A. WEINBERGER, *Examiner.*

M. B. WEBSTER, *Assistant Examiner.*